Patented Jan. 9, 1951

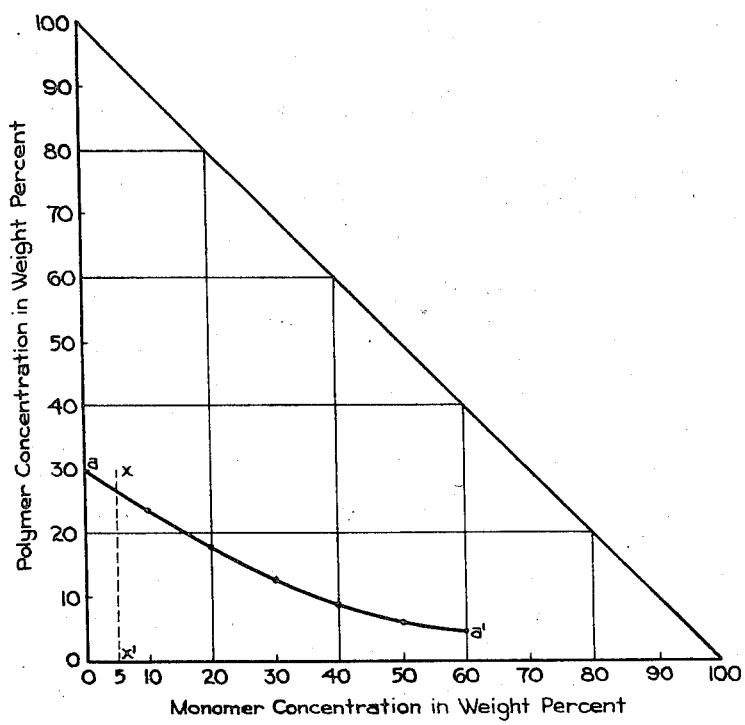

2,537,334

UNITED STATES PATENT OFFICE 2,537,334

PROCESS FOR EMULSION POLYMERIZATION OF VINYLIDENE COMPOUNDS

Willem Leendert Johannes de Nie, Amsterdam, Netherlands, assignor to Shell Development Company, San Francisco, Calif., a corporation of Delaware Application July 6, 1946, Serial No. 681,681
In the Netherlands July 20, 1945

8 Claims. (Cl. 260—91.7)

This invention relates to a process for the manufacture of emulsified aqueous dispersions of polymer from polymerizable unsaturated compounds. More particularly, the invention pertains to an improved method for effecting aqueous emulsion polymerization of substantially water-insoluble vinylidene compounds, i. e. compounds containing the polymerizable group

It is an object of the present invention to provide a process for production of emulsified aqueous dispersions of polymer from polymerizable unsaturated compounds having as high a concentration of polymer therein as possible while avoiding coagulation and precipitation of the polymer during the course of the polymerization with resulting deposition of agglomerated masses of polymer on the surfaces of the reaction vessel and its fittings. Another object is to provide a process wherein the polymer produced has a high average degree of polymerization and a narrow distribution with respect to molecular weight of the fractions contained in the total polymer, i. e. that the polymer be substantially devoid of low molecular weight material. A further object is to provide an emulsion polymerization process enabling an improved rate of production for a given reaction space.

Although polymerization in aqueous emulsion has been recognized as a highly advantageous method for some time and the method has been extensively employed on the industrial scale for the manufacture of polymers, the reaction system used in the method is so complex that it is only imperfectly understood. In order to obtain as high a production capacity as possible for a given reaction space (most reactors being expensive pressure vessels), it is desirable that the aqueous emulsion contain a high concentration of monomer, i. e. that the aqueous phase be kept to a minimum. When the customary batch method of emulsion polymerization is employed, it is found quite often that on using high concentrations of monomer to start the polymerization, such as about 35% or higher, based on the weight of the total reaction mixture, the polymer being formed, soon after the polymerization has started, coagulates and precipitates from the emulsion so that agglomerates of the polymer deposit on the surfaces of the reactor and its fittings, such as the stirrer and heating or cooling coils. These polymer deposits, besides causing serious disturbances in the complex reaction system, cling rather tenaciously to the surface where they deposit so that their removal is necessary before the reactor can be used for polymerization of another batch. The removal of the polymer deposit is troublesome and many times difficult. Once the polymer has coagulated and broken from the emulsion, it cannot be restored thereto for ready removal. The deposited polymer must be taken out of the reactor either by using some organic solvent which will dissolve it, or the deposit must be removed by some mechanical means such as scraping or brushing. In order to avoid the possibility of such polymer precipitation and deposits from occurring in the reactor during the course of the polymerization, the reaction system can be operated with the monomer and polymer concentrations not too high. However, this is disadvantageous. The emulsified polymer obtained is very dilute so that the method requires the recovery of the polymer from large amounts of water which is costly, and furthermore, the space in the reactor occupied by the large amounts of aqueous phase is, in effect, lost for useful production of polymer.

Polymerization at too low a concentration of monomer in the emulsified reaction mixture has other disadvantages. It is known, that upon effecting polymerization in aqueous emulsion, the rate of polymerization is not materially different at various monomer concentrations down to a certain minimum, but that upon operating at successively lower concentrations of monomer below this minimum, the rate rapidly decreases as the monomer concentrations become lower and lower. Furthermore, the character of the polymer formed when operating below the monomer concentration at which there is a sharp break in rates of polymerization produces polymer molecules which have lower and lower molecular weight as the monomer concentration becomes less and less. I have found that on effecting batchwise emulsion polymerization of unsaturated compounds containing the vinylidene group, such as vinyl chloride, wherein the aqueous emulsion of monomer is charged to a reactor and polymerization is made to occur with the monomer concentration above the minimum, the polymer formed during the first part of the polymerization will have a narrow distribution with respect to the molecular weight of the fractions therein, but that apparently upon the monomer having decreased below the value at which the rate also rapidly decreases, the polymer produced as the monomer is further consumed in formation of polymer has a molecular weight which becomes lower and lower as the monomer concentration falls. These low molecular weight polymers are, of course, mixed with those of high molecular weight which are formed in the first part of the polymerization. The total polymer will thus have a broad distribution of polymer fractions therein ranging from those with low molecular weight to those with the desired high molecular weight. The presence of low molecular weight fractions in the total polymer is most undesirable. For example, the presence of low molecular weight polymer in polyvinyl chloride is a cause of instability of the total polymer which manifests itself in development of discoloration upon the polyvinyl chloride being heated for working and forming operations as well as also upon merely standing for lengths of time.

In the Netherlands Patent No. 48,467, it is proposed to obtain polymerization products by discontinuing the polymerization at the moment when 40% to 60% of the quantity of monomer originally present remains in unpolymerized form. By interrupting the polymerization as described in this patent, polymers of fairly good properties can be obtained. However, the production capacity (expressed in kilograms of polymer per liter of reaction space per hour) is low for several reasons. First, I have found that even the initial concentration of monomer must be kept low in order to avoid the chance of polymer coagulating and depositing during the polymerization. Consequently, a large proportion of the useful reaction space is occupied by aqueous phase and is lost for producing polymer. Second, while the rate of polymerization is rapid from the time the polymerization starts until the 40% to 60% of the monomer is converted to polymer, at which point the polymerization is interrupted, a large amount of unpolymerized monomer remains which has to be removed, collected and again charged to the reactor for the next batch. Third, this method of polymerization suffers lost production time which is consumed during the induction period, i. e. the period common to emulsion polymerization processes between the time when all external conditions needed for polymerization have been supplied and the time when polymerization actually begins. The time lost during the induction periods in the patented method of polymerization is actually, as a whole, made greater than that encountered with usual batchwise operation for the reason that the unpolymerized 40% to 60% of monomer remaining upon discontinuing the polymerization is subject to the same induction period when it is recovered and again subjected to polymerizing conditions in a subsequent operation. The net result is that polymerization of the total quantity of initial monomer thus takes considerable time. The time used up during the induction periods more than counterbalances the time saved by operating only under conditions of monomer concentration where the rate of polymerization is rapid.

In the process of my invention, the polymerization of a substantially water-insoluble vinylidene compound in aqueous emulsion is effected while adding monomer of the vinylidene compound to the reaction mixture during the polymerization at such a rate that the concentration of monomer in the reaction mixture is maintained within certain limits and furthermore, after the addition of the monomer is discontinued, the polymerization is stopped before the concentration of monomer in the reaction mixture has decreased below the lower limit. By effecting the polymerization in accordance with the method of the invention, certain unexpected advantages are realized. When the polymerization is effected in the familiar batchwise method, there is an induction period before the emulsified mixture of monomer begins to polymerize. Upon addition of fresh monomer after polymerization has started, as in the method of the invention, it would be expected that this fresh monomer would also be subject to an induction period before it would polymerize and that it would either stop the polymerization from occurring or at least decrease the rate of polymerization. I discovered, on the contrary, that the addition of the fresh monomer actually increases the rate of polymerization over that which occurs when no fresh monomer is added. Consequently, only a small proportion of time is lost during an induction period, especially since the monomer concentration is permitted to fall almost to the minimum of the limits of concentration at the end of the polymerization.

The fresh monomer is added at such a rate that its concentration in the reaction mixture is maintained above that below which the rate of polymerization is directly dependent upon the concentration of monomer. In other words, the concentration of monomer is kept above about 5% to 7% by weight of the reaction mixture with the polymerizable vinylidene compounds employed in the process of the present invention. Between zero and about 5% to 7% concentration, the rate of polymerization is dependent directly upon the concentration of monomer. Above this proportion of monomer, the rate is not materially nor directly affected by the concentration of monomer. By maintaining the concentration above this limit, the polymerization progresses at a rapid rate. Furthermore, the most important result of this feature is my discovery that by maintaining the monomer concentration above this limit during polymerization, as well as stopping the polymerization before the monomer concentration falls below the limit at the end of the polymerization, the polymer produced is exclusively of high molecular weight material devoid of low molecular weight fractions which cause the overall polymerization product to be unstable and subject to discoloration.

The upper limit of the monomer concentration is based on my discovery that the coagulation and precipitation of polymer with resulting deposit of polymer agglomerates on the surfaces of the reactor is dependent upon the monomer concentration becoming too high in relation to the polymer concentration contained therein. This limit will be better understood with the aid of the accompanying drawing which shows the relation of concentration of polyvinyl chloride and monomeric vinyl chloride at which coagulation and precipitation of the polymer occurs.

The values shown in the curve were determined by polymerizing vinyl chloride in aqueous emulsion at 40° C. using in the reaction mixture about 0.2% hydrogen peroxide as catalyst, about 2% of the sodium salt of sulfates from cracked wax olefins containing about 12 to 18 carbon atoms, and sufficient sulfuric acid to give a pH of about 5.5. The table below gives the polymer concentration based on the weight of the reaction mixture for the indicated monomer concentration at which the polymer begins to coagulate and precipitate.

| Monomer | Polymer | Aqueous Phase |
|---|---|---|
| Per cent | Per cent | Per cent |
| 0 | 30 | 70 |
| 10 | 23.4 | 66.6 |
| 20 | 17.9 | 62.1 |
| 30 | 13.2 | 56.8 |
| 40 | 9.4 | 50.6 |
| 50 | 6.5 | 43.5 |
| 60 | 4.5 | 35.5 |

The foregoing values for monomer and polymer concentrations are plotted in the drawing. The monomer concentration being given on the horizontal axis and the polymer concentration on the vertical axis with a smooth curve $aa'$ being drawn through the points. The area below the curve $aa'$ represents the stable region of the emulsion, while the area above curve $aa'$ represents the region in which the coagulation and precipitation of the polymer occurs.

The process of the invention is effective while adding fresh monomer to the reaction mixture during the polymerization at such a rate that the monomer concentration is maintained higher than about 5% vinyl chloride, i. e. to the right of line $XX'$, but not above the monomer concentration at which coagulation of polymer occurs, i. e. below line $Xa'$. In other words, the polymerization is effected while working, for example, within the area $X'Xa'$.

In the process, the upper limit of the monomer concentration is dependent upon the polymer concentration at that moment. Although the shape of the curve in general at which coagulation and precipitation of the polymer will occur will be similar to that shown in the drawing (curve $aa'$), there will be individual minor variations dependent upon the particular monomer being polymerized, the composition of the aqueous phase, and the temperature of operation. The shape of the curve for any particular operation is readily ascertained by a few experiments, and for ordinary operations, the data need not be as extensive as that determined for the curve in the accompanying drawing. The chosen aqueous solution of emulsifying agent and polymerization catalyst is charged to a reactor, heated to the reaction temperature to be used, and a limited quantity of the polymerizable vinylidene compound is charged, e. g. such that there is a 10% concentration of monomer. The mixture is stirred for emulsification, and polymerization is permitted to occur until say 5% of polymer is formed whereupon fresh monomer is introduced as rapidly as possible until the polymer begins to coagulate and precipitate. A determination is then made of the monomer and polymer concentration by methods well known in the art. The experiment is repeated, except that a higher concentration of polymer is permitted to build up in the system, e. g. to 15%, and the limiting value of monomer is again determined. By repeating the experiment a third time with still a higher concentration of polymer, three points will be obtained which are sufficient to determine the shape of limiting monomer-polymer curve. With the aid of this curve the process of the invention can be properly executed so that the monomer concentration is always kept below the limiting concentration. In execution of the process, the polymer concentration can be determined during the polymerization by withdrawing a sample of the emulsion, evaporating the monomer therefrom, and ascertaining the polymer concentration from the specific gravity of the remaining polymer emulsion in usual fashion. From this determination and the curve correlating the limiting concentration of monomer and polymer, the rate of addition of monomer can be regulated. A better method of regulating the addition is by calculating the rate at which monomer should be added so as to remain in the stable area bounded by the curve and introducing the monomer in accordance with these calculations.

The process of the invention is particularly applicable for polymerization in aqueous emulsion of substantially water-insoluble compounds capable of addition polymerization that contain a vinylidene group $$CH_2=C\diagup\diagdown$$

and no other polymerizable group, such as vinylidene compounds like vinylidene chloride or bromide; vinyl esters of halogen acids like vinyl chloride or vinyl bromide; vinyl esters of saturated monocarboxylic acids like vinyl acetate, chloracetate, propionate or benzoate; acrylic acid or substituted acrylic acids and their esters with saturated monohydric alcohols like methyl, ethyl or butyl acrylates, methacrylates or chloracrylates; monovinyl aromatic hydrocarbons like styrene, methyl styrene or chlorostyrene; unsaturated nitriles like acrylonitrile or methacrylonitrile; alkyl vinyl or isopropenyl ketones like methyl vinyl ketone, methyl isopropenyl ketone or ethyl vinyl ketone; and like singly olefinic vinylidene compounds.

The aqueous phase employed to effect the emulsion polymerization in the process of the invention is made up with the emulsifying agent therein. Various emulsifying agents are suitable such as soaps like sodium and/or potassium myristate, laurate, palmitate, oleate, stearate, rosinate and/or hydroabietate; or alkali metal alkyl or alkylene sulfates or sufonates such as sodium and/or potassium lauryl sulfate, cetyl sulfate, oleyl sulfonate, stearyl sulfonate, sulfonated Turkey red oil, sulfonated mineral oils, etc., as well as ammonium salts thereof; or salts of higher amines like lauryl amine hydrochloride, or stearyl amine hydrobromide. Ordinarily about 2% to 5% of the emulsifying agent or mixtures thereof in the aqueous phase is suitable. In many cases it is desirable to work with an acidic emulsion such as one having a pH in the range of 1 to 6. This is attained by the use of proper emulsifying agents which function effectively in acid medium such as sodium alkyl sulfates or amine salts like lauryl amine hydrochloride and by adjusting the pH with addition of a strong mineral acid such as hydrochloric, sulfuric, or nitric.

An oxygen-yielding catalyst is employed to effect the desired polymerization. Preferably the catalyst is water-soluble as is the case with hydrogen peroxide, sodium or potassium persulfate, percarbonate and perborate, peracetic acid and tertiary butyl hydroperoxide, although other catalysts can be used like benzoyl peroxide, acetyl peroxide, acetyl benzoyl peroxide, lauryl peroxide, acetone peroxide, etc. About 0.1% to 5% catalyst in the reaction medium is suitable.

The temperature of operation in the process of the invention will vary over considerable limits depending, for best results, to considerable extent, on the particular vinylidene compound or compounds being polymerized. Thus the temperature limits may be as low as 15° C. and in extreme cases as high as about 150° C. Ordinarily temperatures from about 20° C. to 80° C. are employed. Sufficient pressure is of course applied to the reaction mixture to maintain the constituents in liquid phase.

In executing the process of the invention, the addition of fresh monomer to the reaction mixture while the polymerization is occurring may be made at such a rate that the monomer concentration is maintained at approximately a constant value within the range specified hereinbefore. For example, the monomer can be added continuously so that the monomer concentration is maintained only slightly above the minimum of the range. If desired, the monomer can be added in portions during the polymerization, in which case the monomer concentration will be high when each portion is first added, but will fall as polymerization progresses. Of course, the portions are not so large that the coagulation and precipitation of polymer occurs. Another portion is then added before the monomer concentration falls below the concentration wherein low molecular weight polymers are produced.

After stopping the addition of monomer to the reaction mixture, the monomer already present is being converted to polymer, and consequently, the monomer concentration decreases directly as the polymer concentration increases. In order that as much as possible of the monomer present be converted to polymer, it is desirable that the monomer concentration be permitted to decrease close to the lower limit of concentration, namely, 5% to 7%, but not below that value before the polymerization is discontinued. Thus, the monomer concentration is permitted to decrease to 7% to 8%, or at least to about 10% to 12%. Since after discontinuing the addition of fresh monomer to the reaction mixture, the increase in concentration of polymer is equal to the decrease of concentration of monomer, and the relationship between polymer concentration and monomer concentration at which coagulation and precipitation of polymers occurs is not the same as this increase and decrease, it is desirable to discontinue the addition of fresh monomer at a sufficiently low value that the polymer concentration building up after discontinuance of monomer addition is not such that polymer coagulation and precipitation of polymer occurs, or that the polymerization is discontinued before this limit is reached.

If desired, the polymerization can be initiated with a low monomer concentration, i. e. less than about 5% to 7% during the induction period, and as soon as polymerization begins, the monomer is immediately added so as to bring the concentration above the minimum limit where it is maintained during the polymerization by further addition.

The process of the invention can be executed in either batchwise or continuous fashion. The usual reactor for emulsion polymerization is employed which is fitted with blades or paddles for keeping the emulsion in a state of agitation. The reactor also contains heating or cooling means such as coils for circulating steam or heated oil, or cold water, etc. for cooling. When the process is effected in a continuous manner, the method is carried out so the substance to be polymerized in aqueous emulsion is conducted through a series of distinct reaction zones like separate connected reaction chambers. The flow in the method is such that it continuously advances from chamber to successive chamber without appreciable, or preferably no, back flow. The number of reaction zones in series is preferably at least four and may be as many as twenty or even higher. Additional monomer is continuously introduced at one or more of the reaction zones other than the first. The polymerization of monomer in any single reaction zone need not be complete since monomer transferred as such to subsequent zones will be polymerized there. The fresh monomer can be introduced in the form of aqueous emulsion in the subsequent points in the stream and for this purpose a more concentrated emulsion, with respect to the monomer, can be used than is present in the initial reaction zone. Likewise, addition of monomer in the batchwise method can be executed by adding an emulsion which may be more concentrated to the reaction mixture. It is preferable to execute the process so that the concentration of aqueous phase in the reaction mixture will be at least 70%. Excellent results are obtained when the aqueous phase is in such quantity that after removal of unpolymerized monomer there is about 25% polymer contained in the emulsion.

As explained before, the polymerization is stopped before the monomer concentration falls below the minimum limit so as to prevent formation of low molecular weight polymer. The polymerization can be stopped by dumping the contents of the reactor and rapidly evaporating the unpolymerized monomer from the reaction mixture in a conventional evaporator operating at reduced pressures. Another method is to add to the reaction mixture a substance which will destroy the polymerization catalyst such as sodium sulfite.

The product from the process is an aqueous dispersion of emulsified polymer. The polymer is recovered therefrom by coagulation, filtering and drying according to methods well known in the art. The polymer obtained from the method, besides being produced in a rapid and most efficient maner, has a narrow distribution of molecular weights and is substantially free of material having markedly low molecular weight. The homopolymers are produced by using a single vinylidene compound as the sole polymerizable constituent in the reaction mixture, and the monomer added during polymerization is this same compound. If desired, other polymerizable, substantially water-insoluble, vinylidene compounds than those described hereinbefore can be polymerized by the method such as vinylidene compounds which contain a plurality of olefinic linkages between aliphatic carbon atoms that are adapted to enable formation of addition polymers as is the case with such typical compounds as butadiene-1,3, isoprene, 2,3-dimethyl butadiene-1,3, chloroprene, divinyl benzene, 2-methyl pentadiene-2,4, 2-methyl pentadiene-1,3, ethylene glycol dimethacrylate, diallyl phthalate, diallyl diglycolate, allyl vinyl phthalate, diallyl maleate, diallyl fumarate, diallyl ether of ethylene glycol, triallyl ether of glycerol, and similar compounds as well as their homologues. The fresh monomer added is always of the same chemical identity as that of the polymer being formed.

For example, if copolymers are manufactured by the process, the monomer added is a mixture of the same compounds which are constituents in the polymer. Thus, in forming a copolymer of vinyl chloride and methyl methacrylate, the monomer added during the polymerization is a mixture of vinyl chloride and methyl methacrylate.

For the purpose of illustrating several applications of the method of the invention, the following examples are given.

Example I

Into an autoclave of V2A steel equipped with stirrer and having a capacity of about 10 liters, there was introduced about 2.5 kg. of water, 0.41 kg. of a 24% aqueous solution of cetyl sulfate, 0.09 kg. of a 9% aqueous solution of hydrogen peroxide, and 5 ml. of 4 normal sulfuric acid. The pH of this solution was about 5.8. The liquid was heated to 50° C., and while stirring vigorously, about 1 kg. of distilled vinyl chloride was added under pressure. After approximately 3½ hours polymerization was perceived to set in. About 0.5 kg. of vinyl chloride was then added under pressure in the course of an hour, and after a further 15 minutes had elapsed, the polymerization was discontinued by transferring the entire contents of the autoclave through a cooler to a reservoir in which the unconverted vinyl chloride, amounting to about 0.55 kg., was quickly evaporated.

The polymer suspension obtained in this manner had a concentration of approximately 25% polymer, the specific gravity being 1.060. There was no deposit of polymer in the reactor.

By coagulation of the emulsified polymer there was obtained, after washing and drying, powdered polymer which was dissolved in methyl cyclohexanone. A 5% solution of this polymer at 25° C. had a viscosity of about 14 centipoises.

A comparative test in which no extra vinyl chloride was added under pressure yielded the result that after the induction period had come to an end, 3 hours elapsed before the monomer was almost entirely converted. A 5% solution in methyl cyclohexanone of the polymer obtained in this manner had a viscosity of about 8 centipoises at 25° C., indicating a lower average degree of polymerization for the reason that the total polymer had a broad distribution with respect to the molecular weight of fractions contained therein. This low molecular weight material was produced during the latter part of the polymerization when the monomer concentration had decreased below about 5%.

Example II

There was introduced into a V2A autoclave having a capacity of about 100 liters and fitted with a stirrer, about 25 kg. of water, 4.1 kg. of a 24% aqueous solution of cetyl sulfate, 0.9 kg. of a 9% aqueous solution of hydrogen peroxide and 50 ml. of 4 normal sulfuric acid. The pH of this solution amounted to about 5.8. The liquid contained in the autoclave was heated to about 65° C., and while stirring vigorously, about 1 kg. of vinyl chloride was added under pressure. After approximately 1½ hours, polymerization was observed to have begun. The temperature was then quickly decreased to 40° C., and at this temperature, about 5 kg. of monomeric vinyl chloride was rapidly added under pressure. Subsequently, in the course of ½ hour, a further quantity of about 9 kg. of vinyl chloride was added. This rate was such that throughout the addition under pressure, the monomer concentration is higher than about 5% by weight but is not so high that coagulation and precipitation of the polymer would occur. After the addition under pressure was completed, the monomer concentration decreased, and at the moment when it amounted to about 5%, the polymerization was discontinued by transferring the entire contents via a cooler to a reservoir in which the unconverted vinyl chloride (about 5.5 kg.) was quickly evaporated.

The polymer suspension obtained by the process had a concentration of approximately 25% by weight. There were no polymer deposits in the reactor.

By coagulation of the emulsified suspension, a polymer was obtained which, after washing and drying, was dissolved in methyl cyclohexanone to make a 5% solution. This solution had a viscosity of approximately 50 centipoises at 25° C. This polymer solution had a higher viscosity, it will be noted, than that obtained in Example I for the reason that the polymerization was effected at a lower temperature.

A comparative test in which no extra vinyl chloride was added under pressure yielded the result that after the induction period had come to an end about 3 hours were required for the monomer to become almost entirely converted to polymer. A 5% solution of this polymer in methyl cyclohexanone gave a viscosity of only about 25 centipoises at 25° C.

I claim as my invention:

1. In a process for producing an aqueous emulsion of polymer by subjecting a substantially water-insoluble polymerizable vinylidene compound to polymerizing conditions in aqueous emulsion, the improvement which comprises effecting the polymerization with the monomer of the vinylidene compound in liquid phase while adding additional liquid monomer of said vinylidene compound to the reaction mixture at such a rate that the concentration of the liquid monomer in the reaction mixture is maintained below that at which the forming polymer coagulates and precipitates from the emulsion and above 5% to 7% by weight of the reaction mixture, and after discontinuing the addition of the liquid monomer to the reaction mixture continuing the polymerization until the monomer concentration has decreased to 5% to 7% by weight of the reaction mixture, but stopping the polymerization before the monomer concentration has decreased below 5% to 7% by weight of the reaction mixture.

2. In a process for producing an aqueous emulsion of polymer by subjecting a substantially water-insoluble polymerizable compound containing a vinylidene group

and no other polymerizable group to polymerizing conditions in aqueous emulsion, the improvement which comprises effecting the polymerization with the monomer of the vinylidene compound in liquid phase while adding additional liquid monomer of said vinylidene compound in the reaction mixture is maintained below that at which the forming polymer coagulates and precipitates from the emulsion and above 5% to 7% by weight of the reaction mixture, and after discontinuing the addition of the liquid monomer to the reaction mixture continuing the polymerization until the monomer concentration has decreased to 5% to 7% by weight of the reaction mixture, but stopping the polymerization before the monomer concentration has decreased below 5% to 7% by weight of the reaction mixture.

3. In a process for producing an aqueous emulsion of polyvinyl chloride by subjecting vinyl chloride to polymerizing conditions in aqueous emulsion, the improvement which comprises effecting the polymerization with the monomer of the vinyl chloride in liquid phase while continuously adding additional liquid monomer of vinyl chloride to the reaction mixture at such a rate that the concentration of the liquid monomer in the reaction mixture is maintained below that at which the forming polymer coagulates and precipitates from the emulsion and above 5% to 7% by weight of the reaction mixture, and after discontinuing the addition of liquid monomer to the reaction mixture continuing the polymerization until the monomer concentration has decreased to 5% to 7% by weight of the reaction mixture, but stopping the polymerization before the monomer concentration has decreased below 5% to 7% by weight of the reaction mixture.

4. In a process for producing an aqueous emulsion of polyvinylidene chloride by subjecting vinylidene chloride to polymerizing conditions in aqueous emulsion, the improvement which comprises effecting the polymerization with the monomer of the vinylidene chloride in liquid phase while continuously adding additional liquid monomer of vinylidene chloride to the reaction mixture at such a rate that the concentration of the liquid monomer in the reaction mixture is maintained below that at which the forming polymer coagulates and precipitates from the emulsion and above 5% to 7% by weight of the reaction mixture, and after discontinuing the addition of liquid monomer to the reaction mixture continuing the polymerization until the monomer concentration has decreased to 5% to 7% by weight of the reaction mixture, but stopping the polymerization before the monomer concentration has decreased below 5% to 7% by weight of the reaction mixture.

5. In a batch process for producing an aqueous emulsion of polyvinyl chloride by subjecting vinyl chloride to polymerizing conditions in aqueous emulsion contained in a reactor without discharging any of the emulsion from the reactor until the end of the polymerization, the improvement which comprises subjecting the reaction mixture containing liquid monomeric vinyl chloride in aqueous emulsion to polymerizing conditions while continuously adding additional liquid monomeric vinyl chloride to the reaction mixture at such a rate that the reaction mixture is maintained above 5% by weight of the reaction mixture during the polymerization and below that at which coagulation and precipitation of polyvinyl chloride from the emulsion occurs, and after discontinuing the addition of monomer permitting the polymerization to continue until the monomer concentration has decreased to 5% by weight of the reaction mixture, but stopping the polymerization before the monomer concentration has decreased below 5% by weight of the reaction mixture.

6. In a process for producing an aqueous emulsion of polyvinyl chloride by subjecting liquid vinyl chloride to polymerizing conditions in aqueous emulsion, the improvement which comprises effecting the polymerization with the aqueous phase of the reaction mixture constituting at least 70% by weight of the reaction mixture during the polymerization while continuously adding additional liquid monomeric vinyl chloride to the reaction mixture at such a rate that the concentration of liquid monomeric vinyl chloride in the reaction mixture is maintained above 5% by weight of the reaction mixture, and after discontinuing the addition of monomeric vinyl chloride to the reaction mixture continuing the polymerization until the monomer concentration has decreased to 5% by weight of the reaction mixture, but stopping the polymerization before the monomer concentration has decreased below 5% by weight of the reaction mixture.

7. In a batch process for producing an aqueous emulsion of polyvinyl chloride by subjecting liquid vinyl chloride to polymerizing conditions in aqueous emulsion contained in a reaction without discharging any of the emulsion from the reactor until the end of the polymerization, the improvement which comprises subjecting a reaction mixture of liquid monomeric vinyl chloride in aqueous emulsion to polymerizing conditions and adding additional liquid monomeric vinyl chloride to said reaction mixture as soon as the induction period for polymerization of the original reaction mixture has ended, the addition of said additional monomeric vinyl chloride being continuous and at such a rate that the concentration of monomeric vinyl chloride in the reaction mixture is maintained at all times during the polymerization above 5% by weight of the reaction mixture and below that at which coagulation and precipitation of polyvinyl chloride from the emulsion occurs, and after discontinuing the addition of monomer permitting the polymerization to continue until the monomer concentration has decreased to 5% by weight of the reaction mixture, but stopping the polymerization before the monomer concentration has decreased below 5% by weight of the reaction mixture.

8. In a process for producing an aqueous emulsion of polyvinyl chloride by subjecting liquid vinyl chloride to polymerizing conditions in aqueous emulsion, the improvement which comprises effecting the polymerization with the aqueous phase of the reaction mixture constituting at least 70% by weight of the reaction mixture during the polymerization while continuously adding additional liquid monomeric vinyl chloride to the reaction mixture at such a rate that the concentration of liquid monomeric vinyl chloride in the reaction mixture is maintained substantially constant at a value above 5% by weight of the reaction mixture, and after discontinuing the addition of monomeric vinyl chloride to the reaction mixture continuing the polymerization until the monomer concentration has decreased to 5% by weight of the reaction mixture, but stopping the polymerization before the monomer concentration has decreased below 5% by weight of the reaction mixture.

WILLEM LEENDERT JOHANNES DE NIE.

REFERENCES CITED

The following references are of record in the file of this patent:

UNITED STATES PATENTS

| Number | Name | Date |
|---|---|---|
| 2,179,040 | Heuer | Nov. 7, 1939 |
| 2,339,184 | Neher et al. | Jan. 11, 1944 |
| 2,356,562 | Berg et al. | Aug. 22, 1944 |
| 2,363,951 | Fikentscher | Nov. 28, 1944 |